United States Patent [19]
McDonald

[11] Patent Number: 5,633,621
[45] Date of Patent: May 27, 1997

[54] EVACUATION ASSISTANCE LOCATOR

[76] Inventor: Michael S. McDonald, 458 Aintree Dr., Munroe Falls, Ohio 44243

[21] Appl. No.: 452,687

[22] Filed: May 30, 1995

[51] Int. Cl.$^6$ .................................................. G08B 5/00
[52] U.S. Cl. ........................... 340/286.01; 340/825.19; 395/206; 395/232
[58] Field of Search ................... 395/206, 205, 395/232; 340/825.19, 286.01, 286.07; 235/375, 380

[56] References Cited

U.S. PATENT DOCUMENTS

| | | | |
|---|---|---|---|
| 3,978,470 | 8/1976 | McGuire | 345/22 |
| 4,053,951 | 10/1977 | Hudspeth et al. | 395/550 |
| 4,241,521 | 12/1980 | Dufresne | 340/825.19 |
| 5,101,476 | 3/1992 | Kukla | 364/224.5 |

*Primary Examiner*—Jeffery Hofsass
*Assistant Examiner*—Daniel J. Wu
*Attorney, Agent, or Firm*—Renner, Kenner, Greive, Bobak, Taylor & Weber

[57] ABSTRACT

An evacuation assistance locator, which includes a processor communicative with a memory device contained with a housing, is detachably mounted to a fixed structure, such as an office building, for receiving location information from non-ambulatory individuals to assist emergency personnel in quickly finding the non-ambulatory individuals location in the event of an emergency. The housing also includes a display screen and an input keypad so that the non-ambulatory individual can input their location and departure time information and so that only authorized emergency personnel can retrieve the location information by using a secret access code. A plurality of evacuation assistance locations can be linked to a central office for access by the appropriate personnel.

16 Claims, 2 Drawing Sheets

EVACUATION ASSISTANCE LOCATOR

TECHNICAL FIELD

The invention herein resides generally in the art of security devices for selectively providing location information to emergency personnel. More particularly, the present invention relates to a device which allows anonymous data entry of location information by non-ambulatory individuals so that they may be found by emergency personnel. Specifically, the present invention relates to a computer device, detachably mounted to a fixed structure, which receives anonymous data from non-ambulatory individuals so that they may be located by emergency personnel and wherein the location information is deleted from the computer after a predetermined period of time.

BACKGROUND ART

When responding to emergency situations, police and fire personnel first attempt to identify the specific dangers of the emergency and to determine which individuals are immediately at risk. During the ensuing panic which arises during an emergency, it is difficult for the emergency personnel to ascertain exactly where non-ambulatory individuals may be located. This is especially true in multi-story buildings and large office complexes that are only occasionally visited by non-ambulatory individuals. This problem is further exacerbated because non-ambulatory individuals cannot exit the building because the elevators are automatically returned to the ground floor and are shut down during an emergency situation. Additionally, if a non-ambulatory person has entered the building during non-business hours or without advising anyone of their location, this person is difficult to locate.

The above situation presents numerous safety and liability problems. Primarily, non-ambulatory individuals may be placed in a situation that they cannot extract themselves from. Moreover, the emergency personnel are required to check each and every floor and office of a multi-story building thereby exposing themselves to unnecessary risk. The aforementioned situation also presents liability concerns for the owners of the building. For example, the landlord or owner of the building may be held liable for not providing adequate safety precautions to the non-ambulatory individuals who use their building. Secondarily, the insurance costs for the owners of these buildings are set at a higher level than other building owners who have taken necessary precautions.

A written log could be used by these non-ambulatory individuals so as to provide their intended location and intended departure time so that emergency personnel may locate them in case of an emergency. However, a written log has several drawbacks. Primarily, most non-ambulatory individuals prefer to keep or maintain their anonymity when entering a building. Non-ambulatory individuals prefer to keep their independence and do not want to request assistance every time they enter an office building. Moreover, the written log could be compromised by individuals who might take advantage of the non-ambulatory individuals, thus presenting another safety concern. Yet another drawback of a written log is that emergency personnel may not be able to find where the log is located and thus the non-ambulatory individuals may not receive the immediate special attention that they require in an emergency situation.

Based upon the foregoing, it is evident that there is a need in the art for an evacuation assistance locator wherein the location and estimated departure time of a non-ambulatory individual is recorded in a secure device and wherein this information is only accessible by emergency personnel. Furthermore, there is also a need for an evacuation assistance locator that maintains the anonymity of nonambulatory individuals and wherein the locator device is detachable by only emergency personnel.

DISCLOSURE OF INVENTION

In light of the foregoing, it is a first aspect of the present invention to provide an evacuation assistance locator.

Another aspect of the present invention is to provide an evacuation assistance locator for assisting emergency personnel in finding non-ambulatory individuals in emergency situations.

Still a further aspect of the present invention is to provide an evacuation assistance locator which retains the anonymity of the non-ambulatory individual and his or her location.

Yet an additional aspect of the present invention is to provide an evacuation assistance locator that is detachably mounted at a central location within a structure such as an office building or office complex.

Still another aspect of the present invention is that only current location information and departure time information is retained by the evacuation assistance locator.

A further aspect of the present invention is to provide an evacuation assistance locator that is relatively inexpensive to maintain and install.

The foregoing and other aspects of the present invention, which shall become apparent as the detailed description proceeds, are achieved by an evacuation assistance locator for assisting emergency personnel in finding non-ambulatory individuals, comprising: means for inputting location information of non-ambulatory individuals; memory for storing the location information; and means for retrieving the location information by only authorized emergency personnel.

The present invention also provides a process for providing location information using a computer, wherein the location information is submitted by non-ambulatory individuals and only retrievable by authorized emergency personnel, the process comprising the steps of: displaying instructions for use by non-ambulatory individuals on a display screen of a computer; inputting location information and expected departure time of non-ambulatory individuals; storing the location information in memory carried by the computer; and retrieving exclusively the location information from the memory by emergency personnel using predetermined access criteria.

The present invention also provides a process for providing location information within a structure exclusively to emergency personnel, the process comprising the steps of: detachably mounting a computer having memory, at a predetermined location of a structure; providing instructions for use of the computer; receiving information from an individual entering the structure; storing the location information in the memory; and entering predetermined access criteria into the computer to retrieve the location information of the individuals who have entered the structure.

BEST MODE FOR CARRYING OUT THE INVENTION

Figure 1:
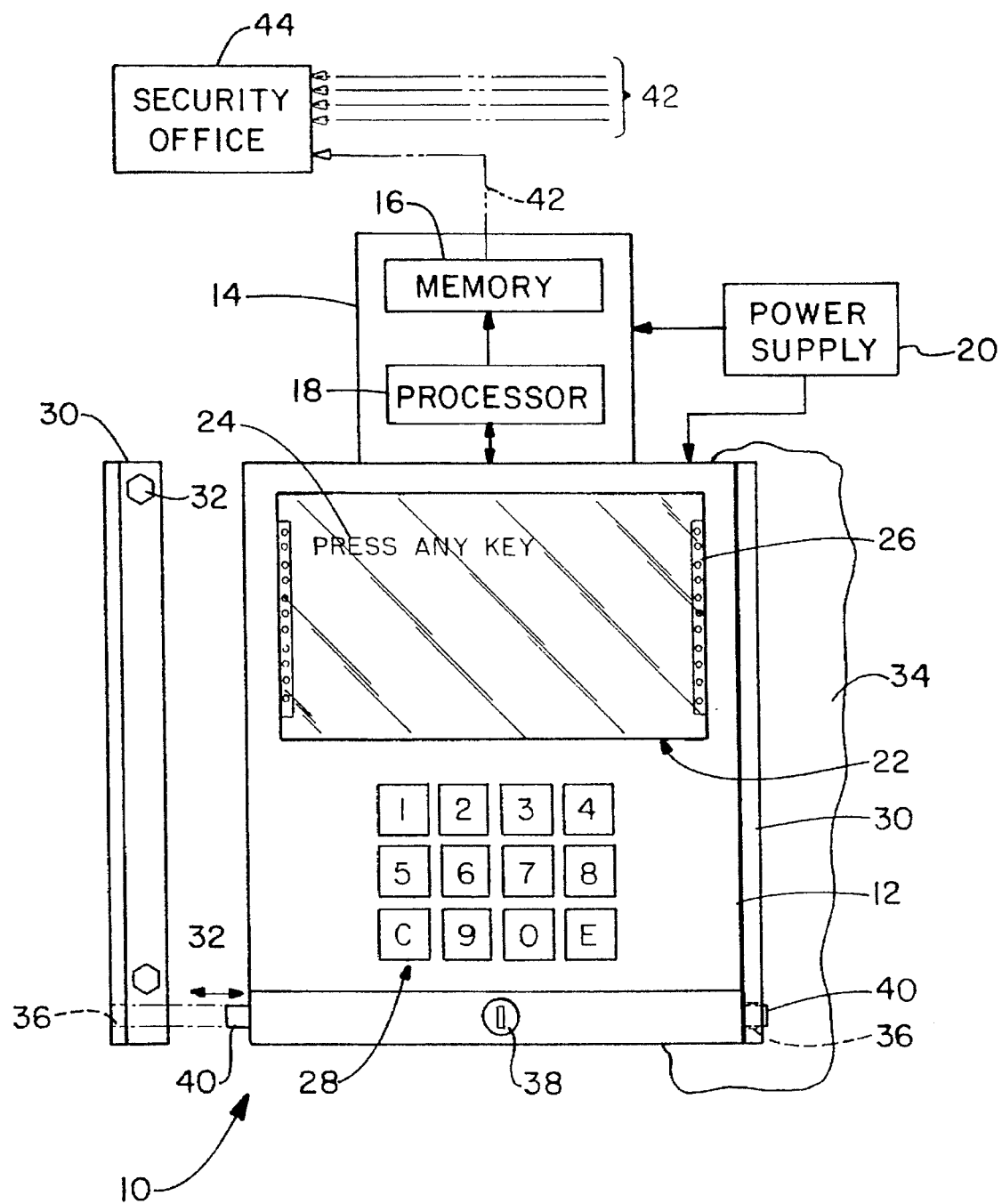
FIG. 1 is a partial perspective and partial schematic view of an evacuation assistance locator according to the present invention.

Referring now to the drawings, and more particularly to FIG. 1, it can be seen that an evacuation assistance locator, according to the present invention, is designated generally by the numeral 10. Generally, the evacuation assistance locator 10 is employed to assist emergency personnel in finding non-ambulatory individuals stranded in a multi-story building or the like during an emergency in which all elevators and escalators have been shut down.

In particular, the evacuation assistance locator 10 includes a housing 12 which contains a computer 14. The computer 14 includes a memory 16 communicative with a processor 18. The processor 18 contains an internal clock and the necessary program functions to operate the evacuation assistance locator 10. Electrically connected to both the computer 14 and the other electrical components within the housing 12 is a power supply 20, such as a battery. A display screen 22 is carried by the housing 12 for displaying instructions to the user and the appropriate emergency personnel. In the preferred embodiment, a set of instructions 24, made up of liquid crystal display characters, are provided upon the display screen 22. It will be appreciated that other types of display characters, such as light emitting diodes, could also be employed. Adjacent to or in close proximity to the display screen 22 are lights 26 which can be selectively activated to illuminate the display screen 22 as required by the end user. A key pad 28 carried by the housing 12 provides the end user with the necessary alpha-numeric characters and function keys required to input location information and for accessing this information as needed. It will be appreciated the function key "C" designates a cancel command and that function key "E" designates an enter command. Mounting brackets 30 are secured to a fixed structure, such as a wall, preferably in a central location of a multi-story structure by fasteners 32. In the preferred use of the present invention, the housing 12 is detachably mounted to a fixed structure 34, which is typically a wall in the lobby of an office building in close proximity to the elevators or escalators of the building or any area where a non-ambulatory person would enter the structure.

The mounting brackets 30 have notches 36 which are aligned with a locking device 38. The locking device 38 has locking tabs 40 which are slidably received by the notches 36. In the preferred embodiment, the locking device 38 is a key actuated device which moves the locking tabs 40 so that they engage the notches 36, thus securing the housing 12 to the mounting brackets 30. It is within the scope of this invention that the locking device 38 could be any type of device which allows the housing 12 to be detachably mounted to the mounting brackets 30.

A communication line 42 is provided from the computer 14 to a central office 44. Those skilled in the art will appreciate that the computer 14 can be linked with other multiple computers 14 to a central office 44 so that location information for non-ambulatory individuals can be quickly accessed by the appropriate emergency personnel when a complex of buildings or facilities is at risk from an emergency situation.

Figure 2:
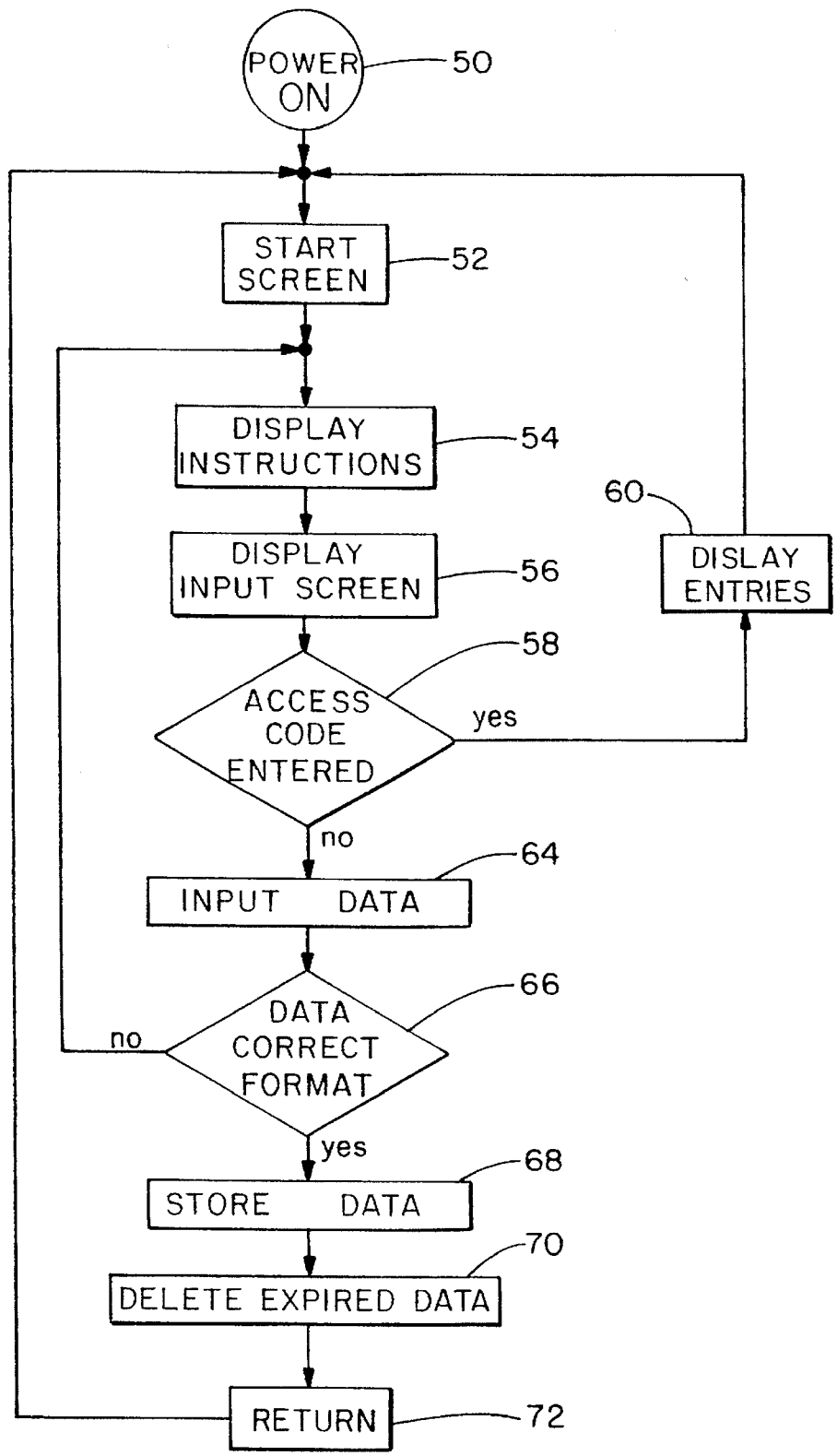
FIG. 2 is a flow chart illustrating the operation of the evacuation assistance locator according to the present invention.

Referring now to FIG. 2, the operation of the program contained within the processor 18 will be discussed. At step 50 of the program, the power supply 20 is activated and communicates with the computer 14 and the electrical components, such as the lights 26. At step 52, a start screen is generated on display screen 22 which provides initial instructions to the user of the device 10. Typically, this instruction is in the form of "press any key to activate." After this is done by the non-ambulatory individual, step 54 provides that the screen 22 display the necessary instructions for the purpose and use of the device 10. For example, the instructions could include information about maintaining the anonymity of the user, and the proper input format for requested location information. The location information could include, but is not limited to, the floor and the room number where the nonambulatory individual is destined and the expected departure time of the individual. The instruction screen also provides instructions for continuing on with the program or for returning to the start screen indicated at step 52. The program also includes an automatic return feature such that if no activity is provided on the keypad 28 for a predetermined period of time, the program automatically returns to the start screen as indicated at step 52.

At step 56, the display screen 22 requests specific information from the user of the device 10. An example of the information requested by the evacuation assistance locator 10 is provided as follows:

Access code if required?—(If not required, press ENTER key)

Floor location?—(Use 0 as first digit, if less than 100th floor)

Room Number?—(If not known, push 0 four times)

Expected departure time?—:—(a.m. press 1; p.m. press 2)

If information is correct, press ENTER.

If information is incorrect, press CANCEL and start again.

At step 58, the processor 18 determines whether certain criteria such as an access code has been entered by the appropriate emergency personnel. The secret access code allows only emergency personnel to retrieve the non-ambulatory individual's location. If the processor determines that an appropriate access code has been entered, the processor at step 60 displays the appropriate active entries of non-ambulatory individuals currently in the facility. These entries are displayed at predetermined time intervals so that the emergency personnel can take the appropriate action to confirm the location of the non-ambulatory individuals.

If tampering with the locator 10 is a concern, building management may provide a user access code to non-ambulatory persons. This would prevent unauthorized individuals from entering false location information or from overloading the memory.

Returning to step 58, if an appropriate access code has not been entered, the process proceeds to step 64 where the appropriate information or input data is provided by the user. At step 66, the processor 18 determines whether the input data is in the correct format. If the data is not in the correct format, the process returns to the beginning of the program at step 54. If the data is in the correct format, the processor 18 stores the data in memory 16 at step 68. When this location information is stored in memory 16, a predetermined period of time subsequent to the departure time is included with the location information. In the preferred embodiment, the predetermined period of time subsequent to the departure time or leeway time is about one hour. At step 70, the processor 18 checks each entry of location information to determine whether the non-ambulatory individual's departure time and leeway time has expired. If so, this location information is deleted from memory 16. Those skilled in the art will appreciate that an independent subroutine contained within the processor 18 may be run at preselected time intervals so that the expired location information is deleted from memory 16. At step 72, the display screen 22 provides confirmation that the location information has been entered and received by the computer 14.

Based upon the foregoing structure and operation of the evacuation assistance locator 10, it should be apparent that numerous advantages are provided. First, the simple operation of inputting and accessing location information is easily done by virtue of the limited number of questions answered by non-ambulatory individuals and emergency personnel. It will also be appreciated that the keypad 28 and the display screen 22 are designed and placed in such a position that a great percentage of non-ambulatory individuals can use the device. A further advantage of the present invention is that the anonymity of the non-ambulatory individual is maintained while still providing location information exclusively to emergency personnel. This has a further advantage in that unscrupulous individuals cannot prey upon these non-ambulatory individuals.

Still another advantage of the present invention is that the housing 12 which contains the computer 14 is detachable from the fixed structure 34. As such, authorized emergency personnel can disengage the housing 12 from the mounting brackets 30 by unlocking the locking device 38 and can carry with them all the necessary location information required to rescue non-ambulatory individuals in an emergency. Accordingly, precious time is saved during an emergency by quickly ascertaining the location of non-ambulatory individuals. This also benefits the rescue personnel as they are not placed at risk trying to locate individuals in rooms that do not need to be searched.

Still another advantage of the present invention is that the owners of the building who employ an evacuation assistance locator 10 reduce their liability by providing such a device and accordingly reduce their insurance costs.

Yet another advantage of the present invention is that the locator 10 can be linked to a central security office 44 so that a plurality of evacuation assistance locators 10 can be networked and accessed as needed by the central office in case an emergency situation were to arise for an entire complex of buildings or which precluded access to an individual locator 10.

Thus, it can be seen that the objects of the invention has been satisfied by the structure and operation present above. It should be apparent to those skilled in the art that the objects of the present invention could be practiced for any number of buildings and could provide other pertinent information to emergency personnel.

While a preferred embodiment of the invention has been presented and described in detail, it will be understood that the invention is not limited thereto or thereby. As such, various configurations may be used in the construction and operation of the invention to meet the various needs of the consumer. Accordingly, for an appreciation of the true scope and breadth of the invention, reference should be made to the following claims

What is claimed is:

1. An evacuation assistance locator for assisting emergency personnel in finding non-ambulatory individuals, comprising:

means for electronically inputting location information of non-ambulatory individuals;

memory for electronically storing the location information; and means for electronically retrieving the location information by only authorized emergency personnel.

2. The evacuation assistance locator according to claim 1, further comprising:

a housing which contains a computer that receives the location information;

at least one mounting bracket for carrying said housing, wherein said mounting bracket is securable to a fixed structure.

3. The evacuation assistance locator according to claim 2, further comprising a locking device for detachably mounting said housing to the fixed structure.

4. The evacuation assistance locator according to claim 2, wherein said housing provides a selectively illuminated screen for displaying the location information.

5. The evacuation assistance locator according to claim 2, wherein a processor is communicative with said memory for deleting the location information after a predetermined period of time has elapsed.

6. The evacuation assistance locator according to claim 5, wherein a communication line interconnects said computer to a central office for collecting said location information from multiple locations.

7. A process for providing location information using a computer wherein the location information is submitted by non-ambulatory individuals and only retrievable by authorized emergency personnel, the process comprising the steps of:

displaying instructions for use by non-ambulatory individuals on a display screen of a computer;

inputting location information and expected departure time of non-ambulatory individuals;

storing the location information in memory carried by said computer; and retrieving exclusively the location information from said memory by emergency personnel using predetermined access criteria.

8. The process as in claim 7 and, further comprising the step of:

deleting the location information in memory after a predetermined period of time has elapsed subsequent to the inputted departure time.

9. The process as in claim 8, further comprising the step of:

removing and carrying said computer from a fixed structure by emergency personnel to assist in finding the non-ambulatory individuals.

10. The process as in claim 9, further comprising the step of:

providing a communications link between said computer and a central office for collecting the location information from a plurality of computers.

11. The process as in claim 10, further comprising the step of:

unlocking said computer from at least one bracket secured to a fixed structure prior to the step of removing.

12. The process as in claim 11, further comprising the step of:

providing a power source connected to said computer.

13. A process for providing location information within a structure exclusively to emergency personnel, the process comprising the steps of:

detachably mounting a computer having memory, at a predetermined location of a structure;

providing instructions for use of said computer;

receiving location information from an individual entering the structure;

storing the location information in said memory; and entering predetermined access criteria into said computer to retrieve the location information of the individuals who have entered the structure.

14. The process as in claim 13, further comprising the steps of:

receiving a departure time from an individual entering the structure;

storing the departure time in said memory; and deleting the location and departure time information in memory after a predetermined period of time has elapsed subsequent to the stored departure time.

15. The process as in claim 14, further comprising the step of:

removing said computer from the predetermined location by the emergency personnel to assist in locating those individuals who have entered location information.

16. The process as in claim 15, further comprising the step of:

providing a communication link between said computer and a central office for collecting the location information from a plurality of computers.

* * * * *